US006952534B1

(12) United States Patent
Sikora

(10) Patent No.: US 6,952,534 B1
(45) Date of Patent: Oct. 4, 2005

(54) SYSTEM AND METHOD FOR GENERATING RETURN-TO-ZERO (RZ) OPTICAL DATA IN A DIGITAL LIGHTWAVE COMMUNICATIONS SYSTEM

(75) Inventor: John K. Sikora, McKinney, TX (US)

(73) Assignee: Alcatel, Paris (FR)

( * ) Notice: Subject to any disclaimer, the term of this patent is extended or adjusted under 35 U.S.C. 154(b) by 755 days.

(21) Appl. No.: 09/927,754

(22) Filed: Aug. 10, 2001

Related U.S. Application Data

(60) Provisional application No. 60/228,237, filed on Aug. 25, 2000.

(51) Int. Cl.$^{7}$ .............................................. H04B 10/00
(52) U.S. Cl. ...................................... 398/183; 398/188
(58) Field of Search ................................. 398/182–201

(56) References Cited

U.S. PATENT DOCUMENTS 5,400,417 A * 3/1995 Allie et al. .................... 385/2
5,742,268 A * 4/1998 Noda .......................... 345/84
6,204,954 B1 3/2001 Nagarajan ................... 359/279
6,445,478 B2 * 9/2002 Shimizu et al. ............. 398/192
6,718,142 B1 * 4/2004 Murai ........................ 398/183
6,744,992 B2 * 6/2004 Bergano ..................... 398/183

* cited by examiner

*Primary Examiner*—Agustin Bello
(74) *Attorney, Agent, or Firm*—Danamraj & Youst, P.C.; Jessica W. Smith; V. Lawrence Sewell

(57) ABSTRACT

A system and method for generating return-to-zero (RZ) optical data in a digital lightwave communications system using a two-stage modulator arrangement. RF electrical data is provided to a first stage modulator for modulating a light input into an intermediary optical data output having a non-return-to-zero (NRZ) format. Phase differences between the data and a clock signal associated therewith are controlled via a phase feedback control loop that is operable responsive to a phase dither reference signal. The clock signal is adjusted based on a phase control signal provided by the phase feedback control loop so as to generate a phase-adjusted clock. The phase-adjusted clock is supplied to a second stage modulator operable to blank out a suitable portion of each NRZ data bit interval and thereby create optical data having the RZ format.

28 Claims, 13 Drawing Sheets

SYSTEM AND METHOD FOR GENERATING RETURN-TO-ZERO (RZ) OPTICAL DATA IN A DIGITAL LIGHTWAVE COMMUNICATIONS SYSTEM

PRIORITY UNDER 35 U.S.C. §119(e) & 37 C.F.R. §1.78

This nonprovisional application claims priority based upon the following prior United States provisional patent application entitled: "Feedback Control Of The Clock/Data Phase In A Two-Stage Mach-Zehnder RZ Modulator," filed Aug. 25, 2000, Ser. No. 60/228,237, in the name(s) of: John K. Sikora, which is hereby incorporated by reference for all purposes.

CROSS-REFERENCE TO RELATED PATENT APPLICATION(S)

The present patent application discloses subject matter related to the subject matter of the following commonly owned co-pending patent application(s): (i) "Method And System For First-Order RF Amplitude And Bias Control Of A Modulator," filed Sep. 27, 2000, Ser. No. 09/670,769, in the name(s) of: John K. Sikora, which is(are) hereby incorporated by reference for all purposes.

BACKGROUND OF THE INVENTION

1. Technical Field of the Invention

The present invention generally relates to digital lightwave communications. More particularly, and not by way of any limitation, the present invention is directed to a system and method for generating reliable return-to-zero (RZ) optical data capable of long-haul transmission.

2. Description of Related Art

One of the most important characteristics of a lightwave transmission system is how large a distance can be spanned between a receiver and a transmitter while maintaining the integrity of the transmitted data. Such systems can be limited by the output power of the transmitter, the receiver performance characteristics, specifically receiver sensitivity, or both. The method of modulating the digital output from a transmitter can also greatly influence the distance separating the transmitter from the receiver. Modulating a digital lightwave output generates the digital "1"'s and digital "0"'s that are transmitted, and hence determines the content and integrity of the digital signal. From an economic viewpoint, the distance that can be spanned between a transmitter and a receiver, while maintaining data integrity, determines the expenditures that must be made to physically lay fiber in the ground or to install repeaters and other supporting equipment.

One way to control the output of a transmitter disposed in a digital lightwave communications system is to directly modulate the light source, e.g., a laser source. For example, the laser could be turned on and off at intervals, thus generating digital 1's (when the light source is on) and digital 0's (when the light source is off). This can be accomplished by turning the current to the laser on and off. While this method may work in lower speed applications, in high-speed digital lightwave communications it is not practical to directly modulate the output of the laser because, as the current to the laser is changed, the wavelengths of the laser outputs are also slightly changed.

Direct laser modulation could thus cause significant dispersion in each of the different wavelengths traveling along a fiber optic cable, resulting in noise and data corruption at the far end (i.e., receiver end) of a high-speed digital lightwave system. This is because, particularly in a directly modulated laser system, multiple wavelengths are introduced by the modulation process. Each of these wavelengths has a slightly different propagation time, resulting in overlap at the receiver and therefore in possible data corruption and/or loss. In systems employing wavelength division multiplexing (WDM) schemes, a significant amount of noise also results from carrying multiple wavelengths on a single fiber. This can result in loss of receiver sensitivity, because it is more difficult for the receiver to distinguish between the digital 1's and 0's, and hence to interpret the data carried by the signal.

Accordingly, current high-speed digital lightwave communications systems use modulators instead to modulate the laser output. Modulators do not affect the wavelengths carrying the data signal as much as direct modulation. However, these modulators require a data amplitude input (which data is typically in the range of one or more Gigabits per second (Gbps), i.e., in the radio frequency or RF range) and bias point that must be set and maintained at or near an optimum value for each modulator. Otherwise, the resulting wavelength shift in the transmitted data, along with the inherent noise and dispersion prevalent in lightwave transmission systems, can result in the signals received at the receiver being noisy and difficult to differentiate.

Furthermore, the return-to-zero (RZ) data format is generally preferred over the non-return-to-zero (NRZ) data format in high performance optical communications systems due to the better performance that RZ coding provides in the presence of noise. NRZ data refers to data output in which the data signal does not return to a zero value between data transitions. For example, as alluded to above, if the data output is a digital 0 followed by a digital 1, the light source within the optical transmission system transitions from "off" to "on". However, if the next data bit in the sequence is also a digital 1, the light source remains "on" without transitioning to "off". Two successive digital 1 outputs are thus seen as a continuous "on" period of the light source that is equal to two data intervals. The light source only returns to zero when the next data bit is itself a zero.

Whereas the NRZ data format is simple and inexpensive, it does not provide an optimal solution for long-haul, high-performance optical telecommunications systems. In particular, for example, where broadband (i.e., multi-channel) WDM systems that use optical amplifiers to increase signal performance are employed, noise in the optical signal is also enhanced thereby, which necessitates a higher resolution for reliable data transfer.

It is well known that in the presence of noise RZ coding provides better performance. RZ coding is an optical transmission format that provides a zero transition (i.e., the light source is off) between each data bit. In an RZ system, accordingly, the light source returns to an off condition for half the bit interval. In typical implementations, a clock signal associated with the data is also provided as an input to the modulator, which clock signal is used for blanking out a portion of the data intervals of the NRZ data. However, the phase relationship between the data and clock signal associated therewith must be optimally disposed such that the blanking operation is performed at appropriate times so as not to corrupt the data in the first place.

Current techniques that address this problem involve characterizing the various individual components disposed in the clock and RF data paths and then incorporate fixed temperature compensation in a phase shifter associated with the clock input. While such solutions may be sufficient in some applications, they are not satisfactory in high performance long-haul transmission systems. It should be appreciated that several deficiencies such as, for example, component variation over time, unit-to-unit variance in performance, thermal sensitivity, et cetera, cause the clock/data phase to uncontrollably drift from an initial set point, thereby degrading the reliability of transmitted data.

SUMMARY OF THE INVENTION

Accordingly, the present invention provides a system and method for generating reliable RZ optical data in a digital lightwave communications system using a two-stage modulator arrangement which overcomes these and other deficiencies and shortcomings of the state-of-the-art techniques. RF electrical data is provided to a first stage modulator for modulating a light input into an intermediary optical data output having a non-return-to-zero (NRZ) format. Phase differences between the data and a clock signal associated therewith are controlled via a phase feedback control loop that is operable responsive to a phase dither reference signal. The clock signal is adjusted based on a phase control signal provided by the phase feedback control loop so as to generate a phase-adjusted clock. The phase-adjusted clock is supplied to a second stage modulator operable to blank out a suitable portion of each NRZ data bit interval and thereby create optical data having the RZ format.

In a presently preferred exemplary embodiment of the present invention, a two-stage Mach-Zehnder (MZ) modulator arrangement is used, one stage being the NRZ stage and the other stage being the RZ stage, wherein one input is comprised of the clock signal and the second input is comprised of the NRZ data. RZ coding is achieved with the NRZ data as an input because the clock input is operable to blank half of the bit interval, forcing the data signal to return to zero between each data bit. The apparatus of the present invention, therefore, controls the following five parameters with respect to a two-stage modulator: the NRZ stage RF level (the amplitude of the NRZ data), the NRZ stage bias, the RZ stage RF level (the amplitude of the clock), the RZ stage bias, and the phase relationship between the NRZ data and the clock. The phase relationship between the NRZ data and the clock is maintained by means of the phase feedback control loop such that the clock is adjusted for blanking out the transitional time between data bit intervals and not the actual data bits.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
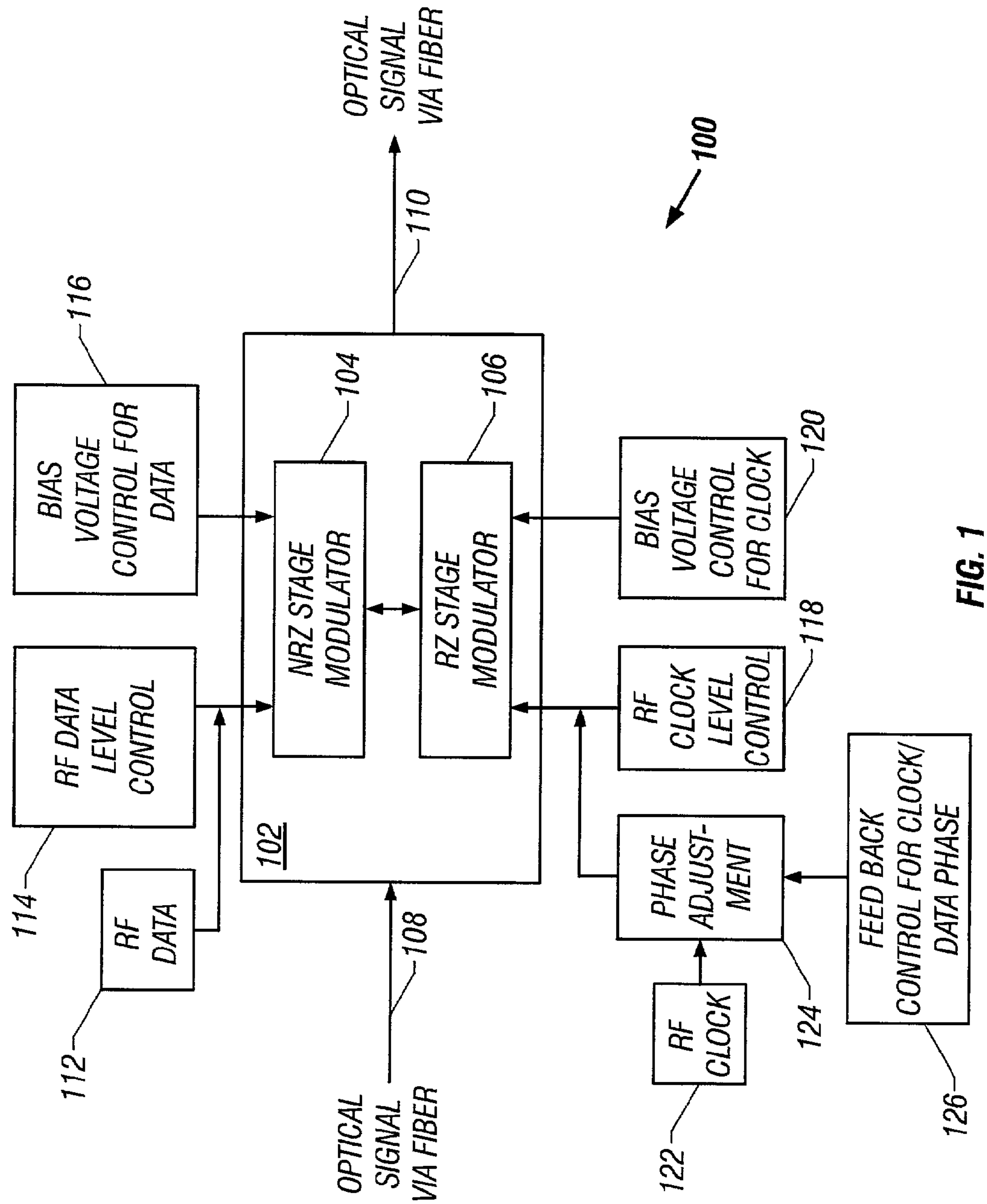
FIG. 1 depicts a functional block diagram of an exemplary embodiment of a system for generating RZ optical data using a two-stage modulator in accordance with the teachings of the present invention.

In the drawings, like or similar elements are designated with identical reference numerals throughout the several views thereof, and the various elements depicted are not necessarily drawn to scale. Referring now to FIG. 1, depicted therein is a functional block diagram of an exemplary embodiment of a system 100 for generating RZ optical data using a two-stage modulator 102 in accordance with the teachings of the present invention. An optical input signal provided by a suitable source is supplied to the two-stage modulator 102 via an optical fiber path 108 to be modulated. The two-stage modulator 102 preferably comprises an NRZ stage modulator 104 and an RZ stage modulator 106 and, for purposes of the present invention, these two modulators may be referred to as first and second stage modulators, respectively.

In a presently preferred exemplary embodiment of the present invention, each of the modulators is comprised of a Mach-Zehnder modulator (MZM), which is also generally known as an MZ interferometer. In general operation of an MZ modulator, an optical signal is split and passed along two optical paths before they are recombined. Typically, each optical path lies along a different branch of the transmission medium, and may have different optical lengths due to different refractive indices of the medium in each branch. On recombining, different frequencies of the optical signal will interfere to different degrees, depending upon the difference in optical length between the two paths. At frequencies for which the different optical lengths result in a phase difference of $\hbar$ radians the signals along each branch will destructively interfere at the output of the MZM. At frequencies for which the different optical lengths result in no phase difference the signals along each branch will constructively interfere.

When a voltage is applied to the two branches of an MZ modulator, the relative refractive indices of the branches—and accordingly their optical lengths—are altered. The amount of constructive interference for a particular frequency (typically the carrier frequency of an optical signal) at the output of the MZ modulator can be varied by varying the voltage applied to the two branches. By modulating the applied voltage, the optical signal can be modulated. The relationship between the applied voltage and the output power at a particular frequency can be represented by what is known as a Mach-Zehnder transfer function.

The halfwave voltage, $V_n$, of an MZ modulator is defined as the difference between the applied voltage at which the signals in branch are in phase and the applied voltage at which the signals are ħ radians out of phase. In other words, $V_n$ is the voltage difference between maximum and minimum output signal power, and thus may also be referred to as peak-to-peak voltage. In order that an MZ modulator be used most efficiently in an optical communications network, it is necessary to know the value of $V_n$ accurately.

In addition, there is another related parameter, the bias point, characterizing an MZ transfer function that is also relevant with respect to optimizing the modulator's performance. Also known as the quadrature point, this parameter signifies where the transfer function crosses the X-axis, i.e., the voltage at which the normalized output light intensity is exactly at the midpoint between the maximum and minimum values. In a symmetric transfer function, therefore, the bias point voltage is the midway point in the range comprising $V_n$.

In modulating electrical data of ultra high bit rates (i.e., radio frequency or RF electrical data having rates of several gigabits per second (Gbps)) onto a carrier optical signal, the RF data signal is applied to the modulator to modulate light from a light source such that when the amplitude of the data signal goes high ("1"), the modulator generates an optical output of maximum intensity, and when the amplitude of the data signal goes low ("0"), the modulator generates an optical output of minimum intensity.

In this discussion of the present invention, normalized values are used to describe the modulator output (from zero to one), and not the actual output values, because the modulator itself does not supply any light. Rather, a laser output is provided as an input to the modulator as will be discussed in greater detail hereinbelow. The laser is operated at a constant current, which provides a constant output power signal. The constant output signal is provided as an input to the modulator. The modulator output thus depends on the output power of the laser. By using normalized values in the present description, the discussion is rendered equally applicable to any input power laser. A "0" value thus corresponds to no light output and a value of "1" corresponds to 100% of the light output.

For optimum modulator performance providing the best extinction ratio (the ratio between maximum and minimum intensity of the output), it is preferred that the amplitude of the RF electrical data be substantially equal to $V_n$. Further, the bias point of the RF electrical data (i.e., the voltage point around which the amplitude swings) should be at the modulator's quadrature. However, as is well known, each modulator can have its own unique $V_n$ and a different quadrature bias point that can vary considerably. $V_n$ can range, for example, from approximately +3 to approximately +5 volts peak-to-peak. Typically, the $V_n$ parameter of the modulator does not vary by much over time, although it can vary widely over temperature. On the other hand, the bias point can and may vary greatly with time.

A method of controlling the RF data amplitude and the bias voltage to a Mach-Zehnder modulator is disclosed in the following commonly owned co-pending patent application: "Method And System For First-Order RF Amplitude And Bias Control Of A Modulator," filed Sep. 27, 2000, Ser. No. 09/670,769, in the name(s) of: John K. Sikora, which is also based on the priority of the provisional patent application (Ser. No. 60/228,237) that forms the basis of the present nonprovisional application. This related patent application (hereinafter referred to as the "NRZ Application"), hereby incorporated by reference for all purposes, describes a scheme for controlling a single modulator stage as used in systems utilizing the NRZ data format. The NRZ optical output data is generated by a modulator from NRZ electrical input data, with the control loops (RF amplitude level feedback loop and bias feedback loop) providing the correct bias to the modulator and the correct level of the NRZ data (the RF amplitude refers to the electrical NRZ data level input to the modulator).

As set forth hereinabove, each of the NRZ stage modulator 104 and the RZ stage modulator 106 of the two-stage modulator arrangement 102 shown in FIG. 1 is preferably comprised of an MZ modulator, wherein two inputs, RF data and clock signals, are advantageously utilized for generating the RZ optical output in accordance herewith. RF data input 112 is provided to the NRZ stage modulator 104, which is controlled via an RF data amplitude level control block 114 and a data bias voltage control block 116. In similar fashion, RF clock input 122 is provided to the RZ stage modulator 106, which clock input is appropriately manipulated by means of a phase-adjusted mechanism 124 described in greater detail hereinbelow. Further, an RF clock level control block 118 and a clock bias voltage control block 120 are included in the system 100 for appropriately controlling the clock signal's level and bias voltage.

Each of the RF level and bias voltage control blocks for the data and clock inputs (corresponding to the NRZ and RZ stages, respectively) is preferably comprised of a $1^{st}$ order feedback control mechanism that is substantially similar to the $1^{st}$ order feedback control scheme in the NRZ Application. Both RZ stage control as well as NRZ stage control will be described in further detail in the forthcoming discussion for the sake of convenience.

In addition to the RF level and bias voltage feedback loops of the NRZ Application, the present invention includes a phase control loop to maintain the phase between clock signal and the RF amplitude data signal at an optimum value. The phase loop is a negative feedback loop to control the phase shift, rather than simply measuring the characteristics of the components involved in the circuit and including temperature compensation in a phase shifter/adjuster. Therefore, a feedback control block 126 is provided in accordance with the teachings of the present invention for controlling the phase difference between the RF data and clock inputs. As will be explained hereinbelow, the feedback control block 126 is operable responsive to a signal derived from the RF data amplitude level control block 114 in order to generate a phase control signal. The phase adjustment block 124 is operable in response to the phase control signal such that the RF clock is appropriately adjusted before being provided to the RZ stage modulator 106. The RZ stage modulator 106 is in turn operable to blank out a select portion of the data bit intervals of the NRZ data so as to generate the RZ optical output, which may be transmitted via an output fiber path 110 emanating from the two-stage modulator 102.

Figure 2:
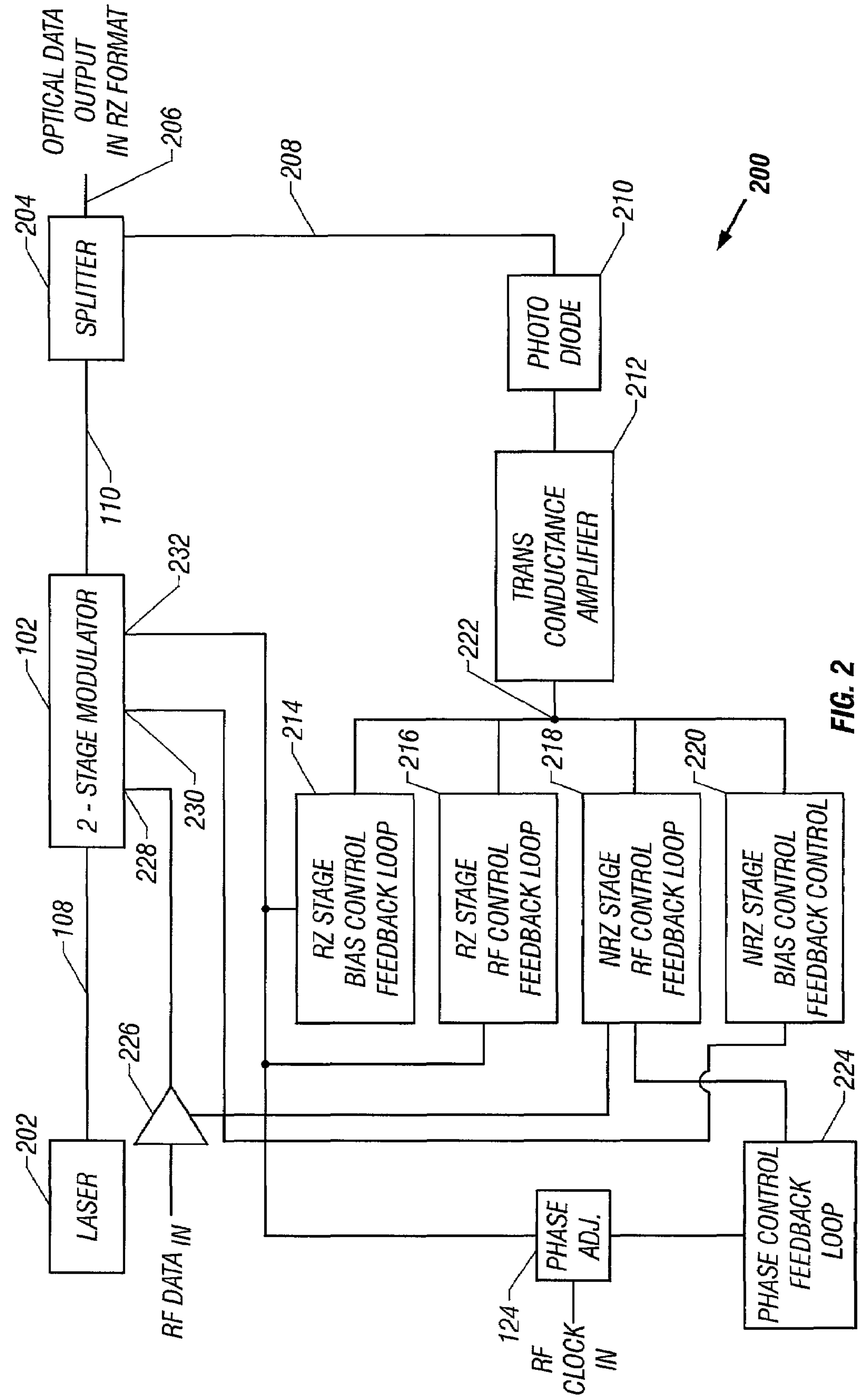
FIG. 2 depicts a block diagram of a feedback controller arrangement for use with the two-stage modulator in accordance with the teachings of the present invention.

Referring now to FIG. 2, depicted therein is a block diagram of a feedback controller arrangement 200 for use with the two-stage modulator 102 in accordance with the teachings of the present invention. Preferably, a continuous wave (CW) laser source 202 is operable to provide an appropriate light input via path 108 to the two-stage modulator 102. Laser source 202 can be any laser, as known to those skilled in the art, for use in a lightwave transmission system. The two-stage modulator 102 includes an RF data input port 228 and a bias voltage input port 230 operable with respect to the NRZ stage modulator (shown in FIG. 1). A common control port 232 is provided with respect to the RZ stage modulator (shown in FIG. 1) for the phase-adjusted clock signal, clock level and bias inputs.

The laser light from laser 202 is modulated by the two-stage modulator 102 based on the inputs to provide modulated optical signal output (i.e., RZ optical data) via path 110 to a splitter 204, which splits the modulated output into optical data output 206 having the RZ format for downstream transmission and a dither signal 208. The dither signal 208, preferably operating at a high frequency, is forwarded to a photodiode 210 operable to convert the optical dither signal into an electrical signal used in the feedback loop arrangement of the present invention.

It should be recognized by those skilled in the art that whereas the two-stage modulator 102 may be comprised of any modulator arrangement having suitable transfer functions for the NRZ and RZ stages, MZ interferometers are used in the presently preferred exemplary embodiment of the present invention. A transconductance amplifier 212 is operable to convert the current signal provided by the photodiode 210 into a voltage signal of suitable magnitude. A common node 222 is operable to provide the voltage output to four separate feedback loop controllers, each of which will be described in further detail hereinbelow in conjunction with FIGS. 8–11, respectively.

Essentially, dither signals applied to the optical modulator cause the modulator to change the output (to make variations in the optical output) and these variations are channeled through the photodiode 210 to the remainder of the feedback controller arrangement via appropriate amplification and filtering. As mentioned, the amplifier at the output of the photodiode 210 can be a suitable transimpedence/transconductance amplifier. The amplified photodiode output is forwarded to the RZ stage control shown in FIGS. 8 and 9, and also to the NRZ stage control shown in FIGS. 10 and 11. Furthermore, the operation of the RZ stage control is essentially the same as that disclosed in the NRZ Application.

Reference numeral 214 refers to a bias point feedback controller associated with the RZ stage of the two-stage modulator provided in accordance with the teachings of the present invention. Reference numeral 216 refers to an RF clock amplitude level feedback controller associated with the RZ stage of the two-stage modulator provided in accordance with the teachings of the present invention. Reference numeral 218 refers to an RF data amplitude level feedback controller associated with the NRZ stage of the two-stage modulator provided in accordance with the teachings of the present invention. Finally, reference numeral 220 refers to a bias point feedback controller associated with the NRZ stage of the two-stage modulator provided in accordance with the teachings of the present invention.

As described in the incorporated NRZ

Application, the output control signal from the NRZ stage RF feedback controller loop 218 is operable as the gain control input to an RF amplifier 226, which modifies the RF data amplitude appropriately.

Continuing to refer to FIG. 2, a phase control feedback loop 224 is operable to receive a signal from the NRZ stage RF data amplitude level feedback control loop 218. As will be explained hereinbelow, the signal received therefrom is indicative, due at least in part to the unique operation of the NRZ stage RF data amplitude level feedback control loop circuitry, of any phase difference that may exist between the intermediary optical data (i.e., the NRZ data) and the RF clock signal associated therewith. The phase control feedback loop 224 is operable to determine the phase difference based on a phase dither reference signal (not shown in this FIG.) and generate a phase control signal. Thereafter, the phase adjuster block 124 is operable responsive to the phase control signal in order that the RF clock input (which is preferably provided as a sinusoidal signal) is appropriately modified into a phase-adjusted clock. The bias and RF level inputs for the clock signal may then be combined with the phase-adjusted clock into a common control signal to be provided to the RZ stage modulator of the two-stage modulator arrangement 102.

FIGS. 3–7 provide graphical representations of various characteristics of the NRZ and RZ data, and the effects of clock/data phase difference thereon, which phase difference effects are related to the rise and fall times (i.e., transitions) in the data waveforms. The relationship between the data transitions and the phase difference will be advantageously utilized in accordance with the teachings of the present invention to drive the phase control feedback loop for generating suitable phase control signals.

Figure 3:
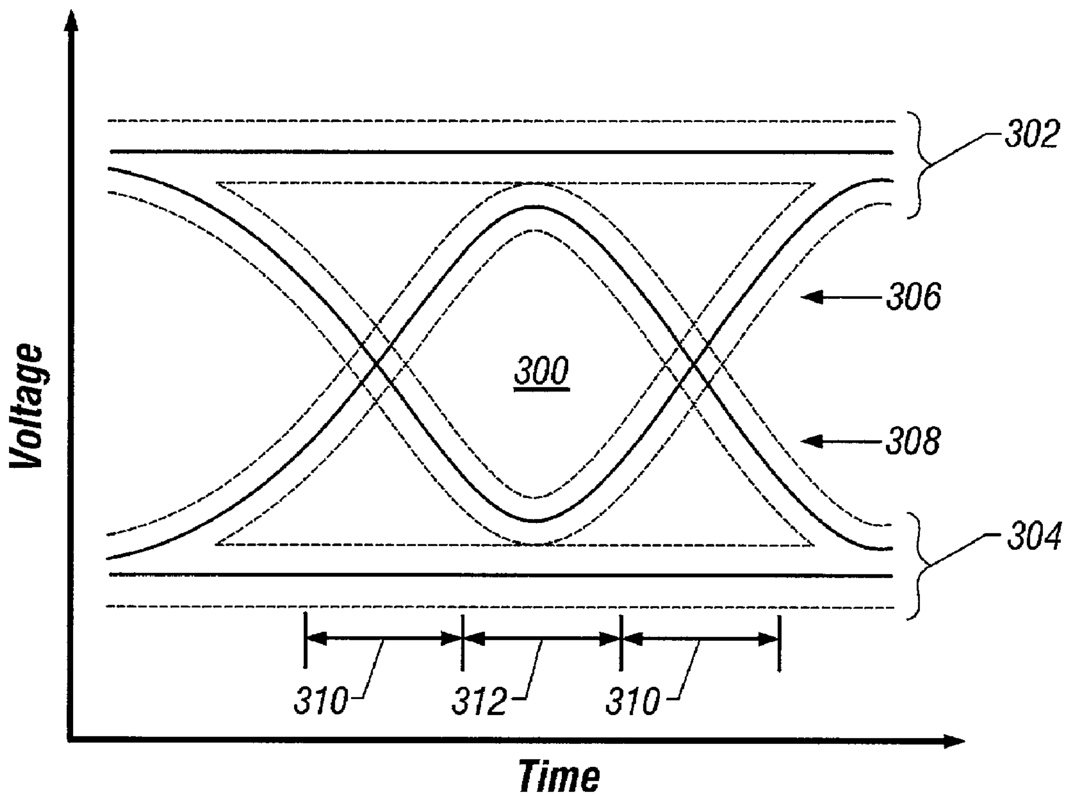
FIG. 3 is a graphical representation of an "eye pattern" associated with NRZ optical data.

Referring in particular to FIG. 3, depicted therein is a graphical representation of an "eye pattern" 300 associated with the NRZ optical data. An upper band 302 across the top of the pattern 300 is generated by the superimposition of consecutive 1's in the data pattern. The NRZ nature of the optical output is exemplified by the band 302, indicating that the optical output does not return to zero between every data interval. A lower band 304 across the bottom of the pattern 300 is similarly generated by the superimposition of a number of consecutive 0's in the optical data. Reference numeral 308 refers to a band created by the superimposition of a plurality of isolated 1's and reference numeral 306 refers to a band created by the superimposition of a plurality of isolated 0's of the optical data.

It can be seen in FIG. 3 that the data transitions, exemplified by portions 310 of the eye pattern 300, take up approximately 40% of the data bit interval, leaving a portion 312 therein that is valid data. As explained in the NRZ Application, the fact that the transitions take up a significant portion of the bit interval causes the RF amplitude loop error amplifier to require an offset voltage to keep the RF level at optimum for accurately determining 1's and 0's at the far end. If no transitions are present in the data, then there is no offset requirement. As will be seen hereinbelow, this relationship between the transitions and offset voltage is advantageously utilized in accordance with the teachings of the present invention to determine and adjust the clock/data phase relationship.

Where RZ data format is required, it is desirable that the phase relationship between the clock and data be such that the transitional portions of the bit interval be blanked out rather than the portion 312 where peaks (for 1's) and nulls (for 0's) occur. Accordingly, if the data and clock signals are aligned appropriately, then the blanking operation in the second stage (i.e., RZ stage) modulator phase can take place in the transitional regions so that maximum spread between the 1's and 0's is achieved.

Figure 4:
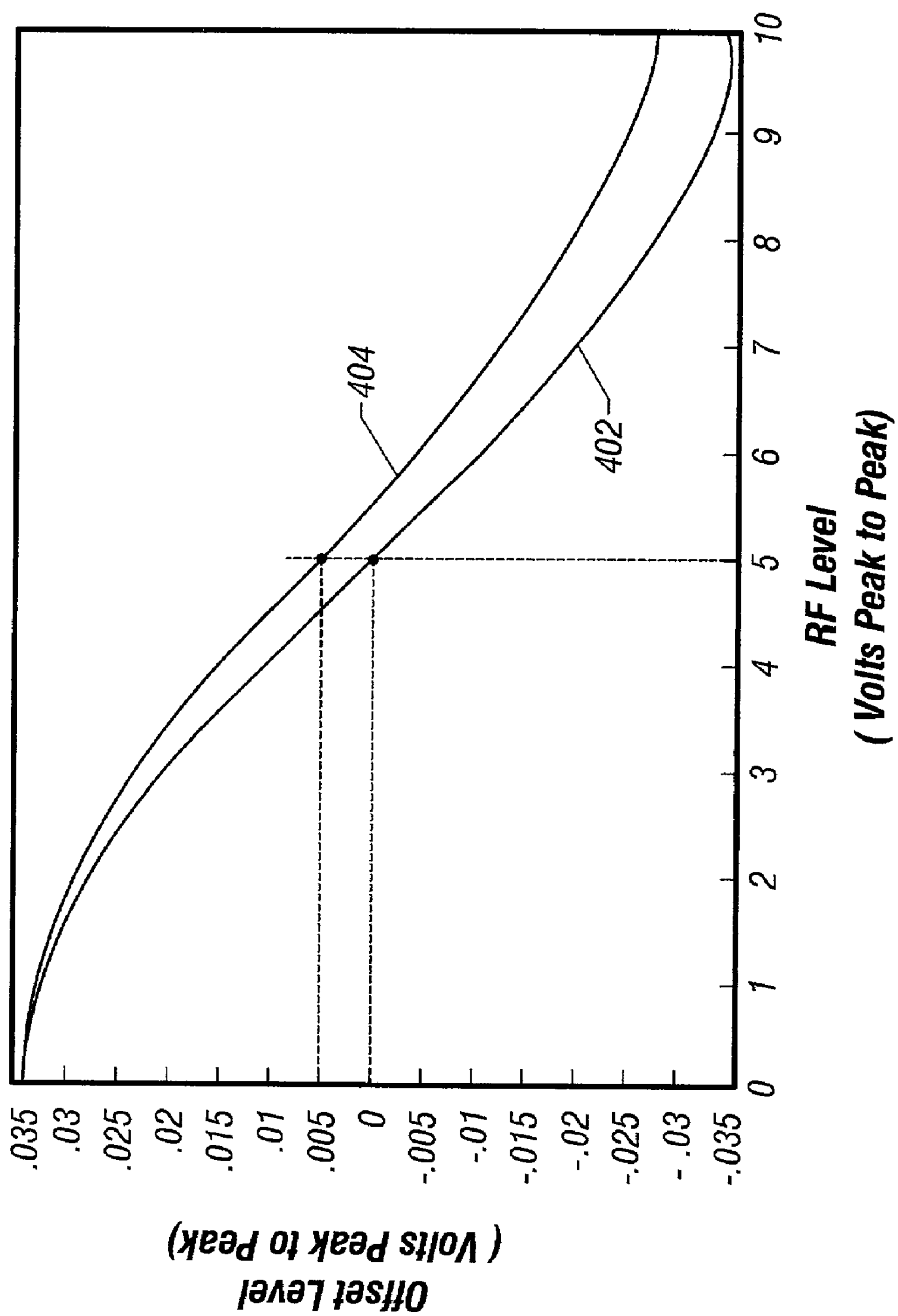
FIG. 4 is a graphical representation of the effect of data transitions on a radio frequency (RF) data amplitude control voltage used in feedback control of an NRZ stage modulator.

FIG. 4 is a graphical representation of the effect of the data transition times on the RF data amplitude control voltage (i.e., the offset level) required, where the nominal RF level in this example is 5 V. If the transitions in the eye pattern of FIG. 3 were instantaneous, then the eye pattern would look like two horizontal rails with vertical dividers, and the bottom curve 402 of FIG. 4 would result. It can be seen from curve 402 that if the transitions were instantaneous (i.e., square wave RF data), no offset level would be needed. In other words, at 5 V of RF amplitude level, curve 402 yields an offset level of 0 V. Accordingly, where $V_n$ of the modulator stage equals 5 V and the RF amplitude level of the data is also 5 V, the offset control output required is zero where there are no transitions.

On the other hand, curve 404 is obtained where the transitions in the data take up about 40% of the bit interval by way of rise times and fall times. It can be readily seen that where the RF amplitude level of the data is 5 V, the offset control output required is approximately about 0.005 V. This slightly positive offset illustrates that the optical output contains non-instantaneous transitions and, therefore, the RF error amplifier associated with the NRZ stage will have to be offset to obtain an optimum output. As will be explained below, if there is an offset on the RF error amplifier, the output of a synchronous (SYNC) detector associated with the RF data amplitude feedback control loop for the NRZ stage will have to be a slightly positive value so that the phase control loop will force the SYNC detector output to be equal to the offset provided to the RF error amp due to the nature of the operation of a negative feedback loop. It is therefore equivalent to say that when there are non-instantaneous transitions, the SYNC detector output in the RF loop of the NRZ stage control will get more positive, which will be utilized as an input to the phase control loop 224 of FIG. 2.

Figure 5:
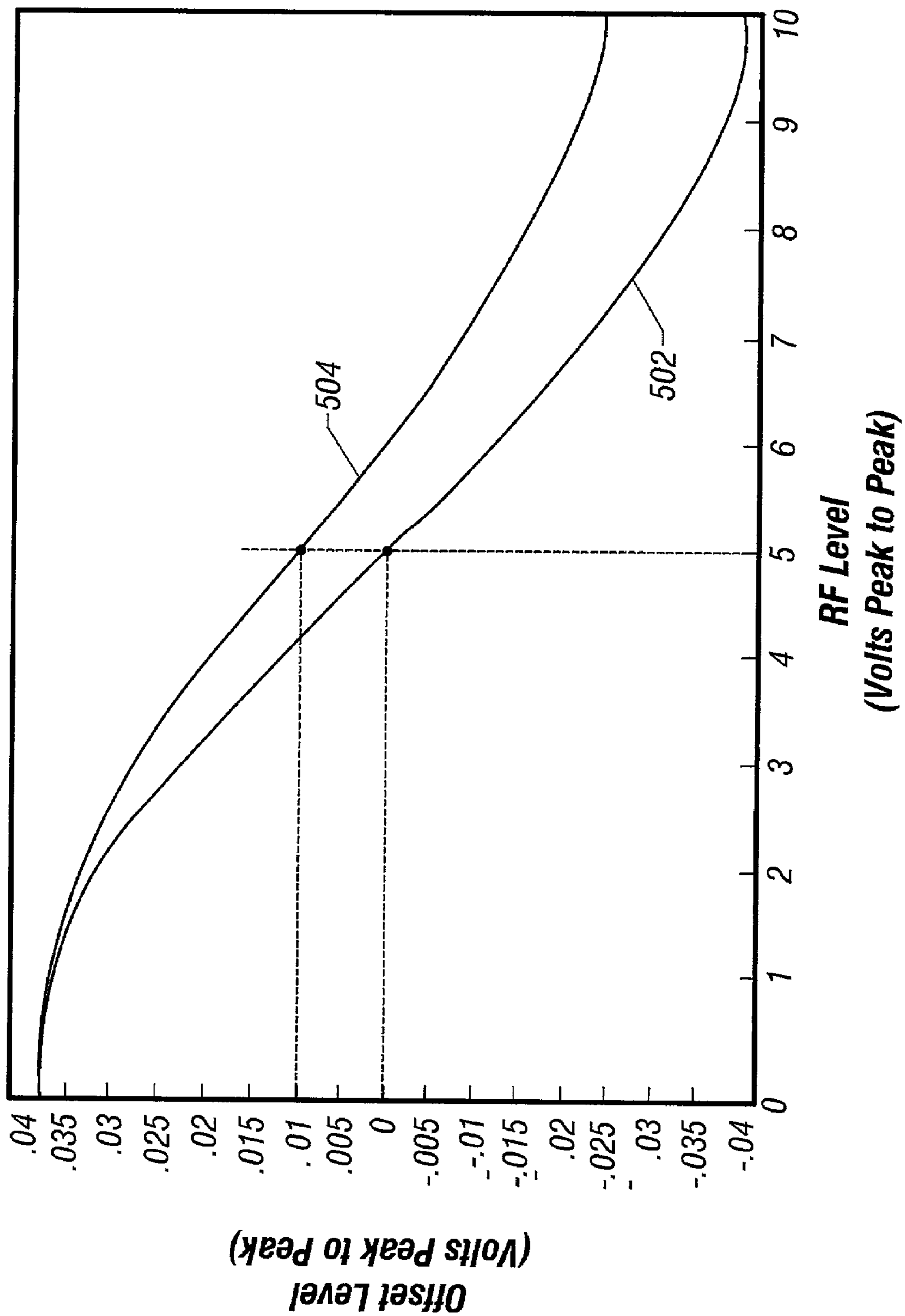
FIG. 5 is a graphical representation of the effect of clock/data phase on the RF data amplitude control voltage used in feedback control of the NRZ stage modulator.

FIG. 5 is a graphical representation of the effect of the clock/data phase on the RF data amplitude offset control used in the feedback control loop of the NRZ stage modulator. Curve 502 represents the relationship between the RF data amplitude level and the offset control voltage where the clock phase is at a nominal value of 0.5 (indicating there are no data transitions). It can be seen from the curve 502 that when the RF amplitude level of the data is 5 V and the clock phase at the nominal value, the offset control output is zero. As pointed out in the foregoing, this is equivalent to the output of the SYNC detector in the RF loop of the NRZ stage control being zero due to the negative feedback operation.

Curve 504 is obtained where the clock phase is either 0.1 or 0.9, which values are indicative of significant transitions in the optical data. It can be seen that when the RF amplitude level of the data is 5 V and the clock phase at either of these values, the offset control output is approximately about 0.01 V (peak-to-peak).

Figure 6:
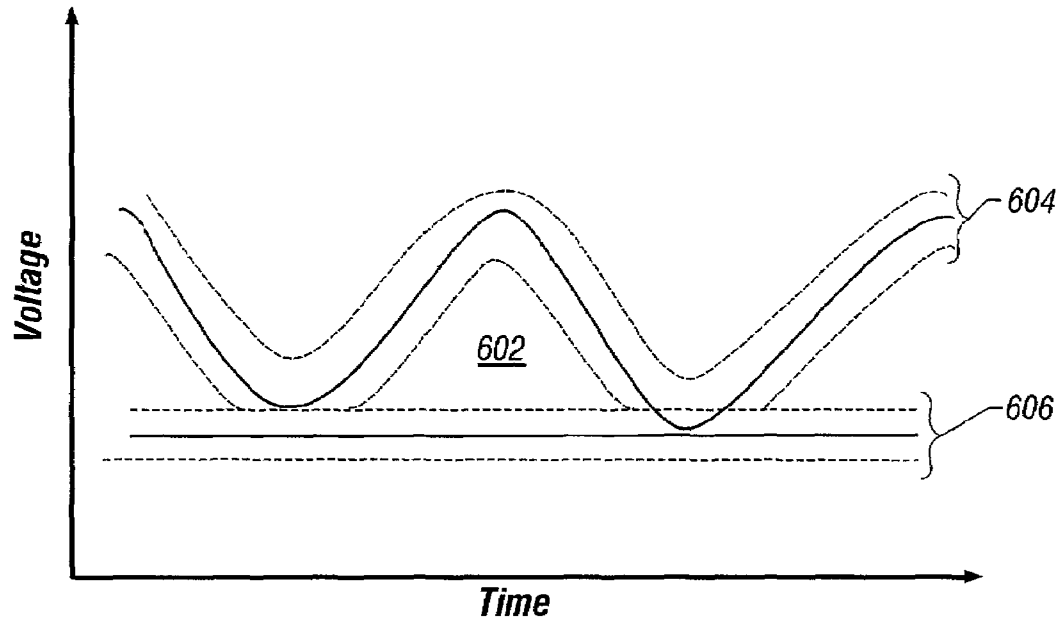
FIG. 6 is graphical representation of an eye pattern associated with RZ optical data where no transitions are seen and the phase of clock and data signals is aligned.

Referring now to FIG. 6, depicted therein is a graphical representation of an eye pattern associated with RZ optical data where no transitions are seen and the phase of the clock and data signals is appropriately aligned. The middle of the clock transfer (where the light is transferred out) is in the middle 602 of the data bit interval. FIG. 6 clearly shows a return-to-zero signal because, unlike in FIG. 3, the rail across the top of the signal is absent. Reference numeral 604 refers to the superimposed 1's and reference numeral 606 refers to the superimposed 0's of the data. Also, it should be noted that in the eye pattern of FIG. 6 there are no NRZ transitions, because the NRZ transitions are nulled by the clock stage modulator. Accordingly, since none of the transitions occur, this is equivalent to providing a square wave to the NRZ stage RF data amplifier loop. Because there are no transitions, furthermore, no offset is needed and hence the SYNC detector output will be zero at $V_n$ for the NRZ stage RF level control. These features will be reflected in the particular exemplary NRZ stage RF amplitude feedback controller embodiment described in additional detail hereinbelow.

Figure 7:
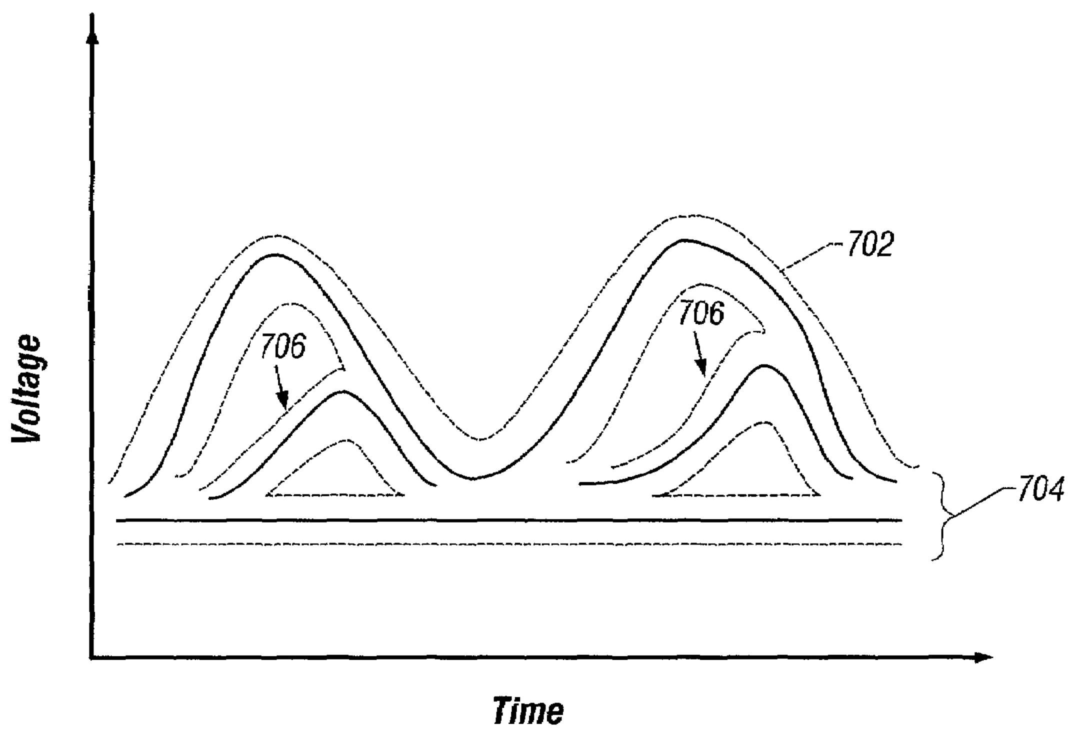
FIG. 7 is graphical representation of an eye pattern associated with RZ optical data where transitions are seen and the phase of clock and data signals is not aligned.

FIG. 7 is a graphical representation of an eye pattern associated with RZ optical data where NRZ transitions are seen and the phase of the clock and data signals is not properly aligned. In this FIG., the clock data phase is offset from the nominal value by a substantial amount for illustration purposes. Reference numeral 702 refers to the superimposed 1's in the data. Similarly, reference numeral 704 refers to the superimposed 0's in the data. As can be seen, the data transitions 706 reappear in the middle of the eye pattern because of the phase difference between the clock and data signals. Because transitions occur, the NRZ RF SYNC detector output will be greater than zero when the NRZ RF level is at optimum. As set forth above, the relationship between the NRZ RF drive level and the output of the NRZ RF sync detector for various phase differences is graphically shown in FIG. 5.

Because transitions occur when the clock and data phase is not aligned, the optical output reflects these transitions and the NRZ stage RF loop SYNC detector output is appropriately adjusted. In accordance with the teachings of the present invention, a way to control the phase and keep it at optimum would be to dither the phase using the phase control loop described below.

In the case of proper alignment, for example, if the clock/data phase is dithered (i.e., the phase is slightly offset) away from the optimum value, first one way and then the other, transitions start to occur in either direction. The transitions that occur for either direction are typically essentially equal, so that the net dither is zero. This is the situation represented in FIG. 6.

In FIG. 7, however, if the clock/data phase signal is dithered first in one direction and then the other, fewer transitions occur when the signal is dithered to the left than when the signal is dithered to the right. In other words, if the clock phase is moved to the right, more transitions occur because the transitions move closer to the signal peak. When dithered to the left, the transitions that occur shift closer to the valley and fewer transitions occur. The net result is an overall positive increase in the transitions that occur. The difference in the transitions that occur with the changes in dither are determined in the SYNC detector of the NRZ stage RF amplitude level feedback control loop set forth hereinbelow in greater detail.

FIGS. 8–11 show block diagrams of the various feedback controllers provided in accordance with the teachings of the present invention for controlling the two-stage modulator. As previously discussed, in the presently preferred exemplary embodiment of the present invention there are five parameters that can be controlled: the NRZ stage RF level, the NRZ stage bias, the RZ stage RF level, the RZ stage bias, and the phase relationship between the NRZ data and the clock. The first four parameters are controlled by essentially the same method as the $1^{st}$ order negative feedback control scheme disclosed in the NRZ Application, with the exception that there are simply two modulator stages being controlled instead of one. Additionally, the present invention also includes a method and system for controlling the clock/data phase in order to generate reliable RZ optical data.

Figure 8:
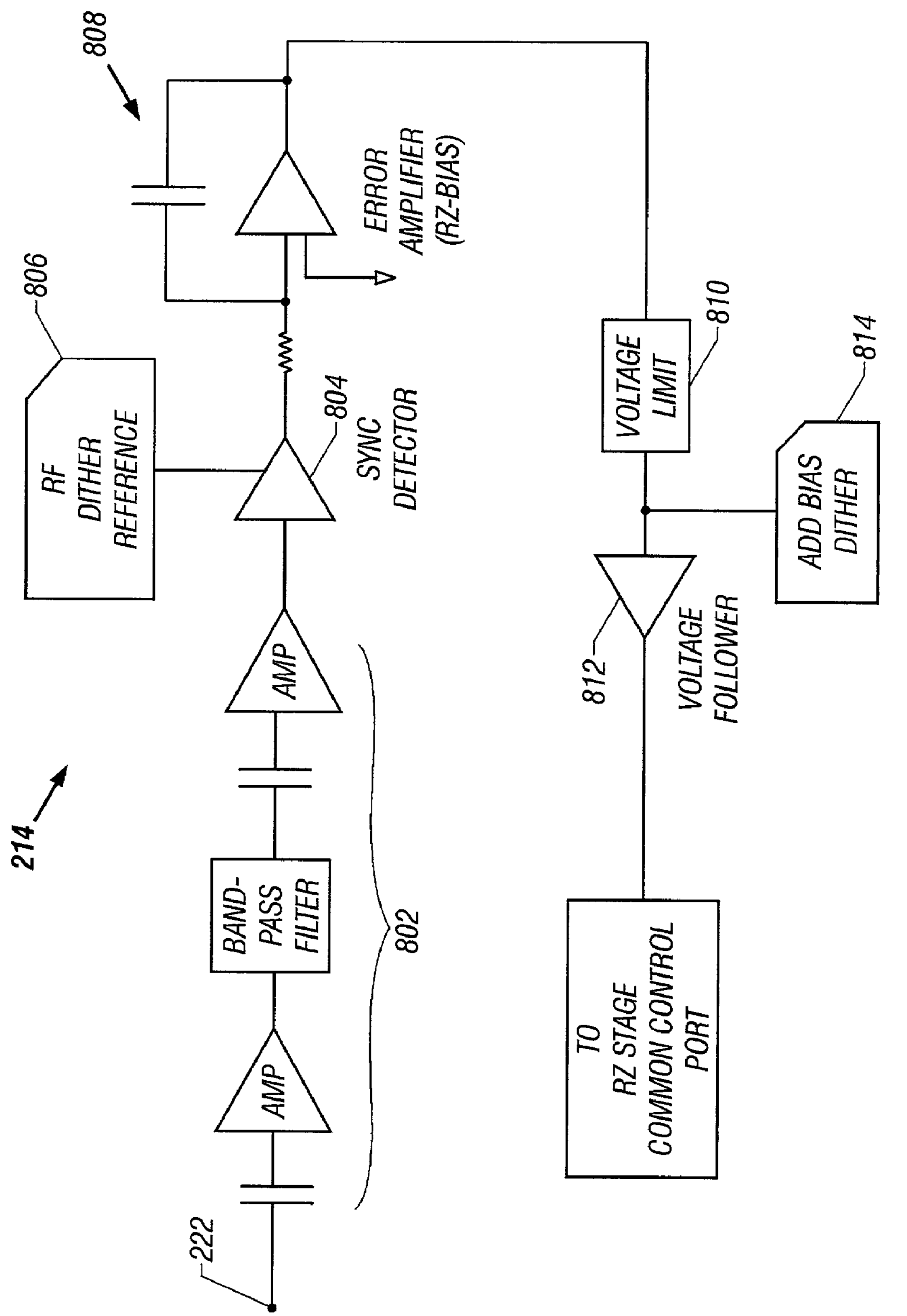
FIG. 8 depicts a circuit block diagram of a bias point feedback controller associated with the RZ stage of the two-stage modulator provided in accordance with the teachings of the present invention.
Figure 9:
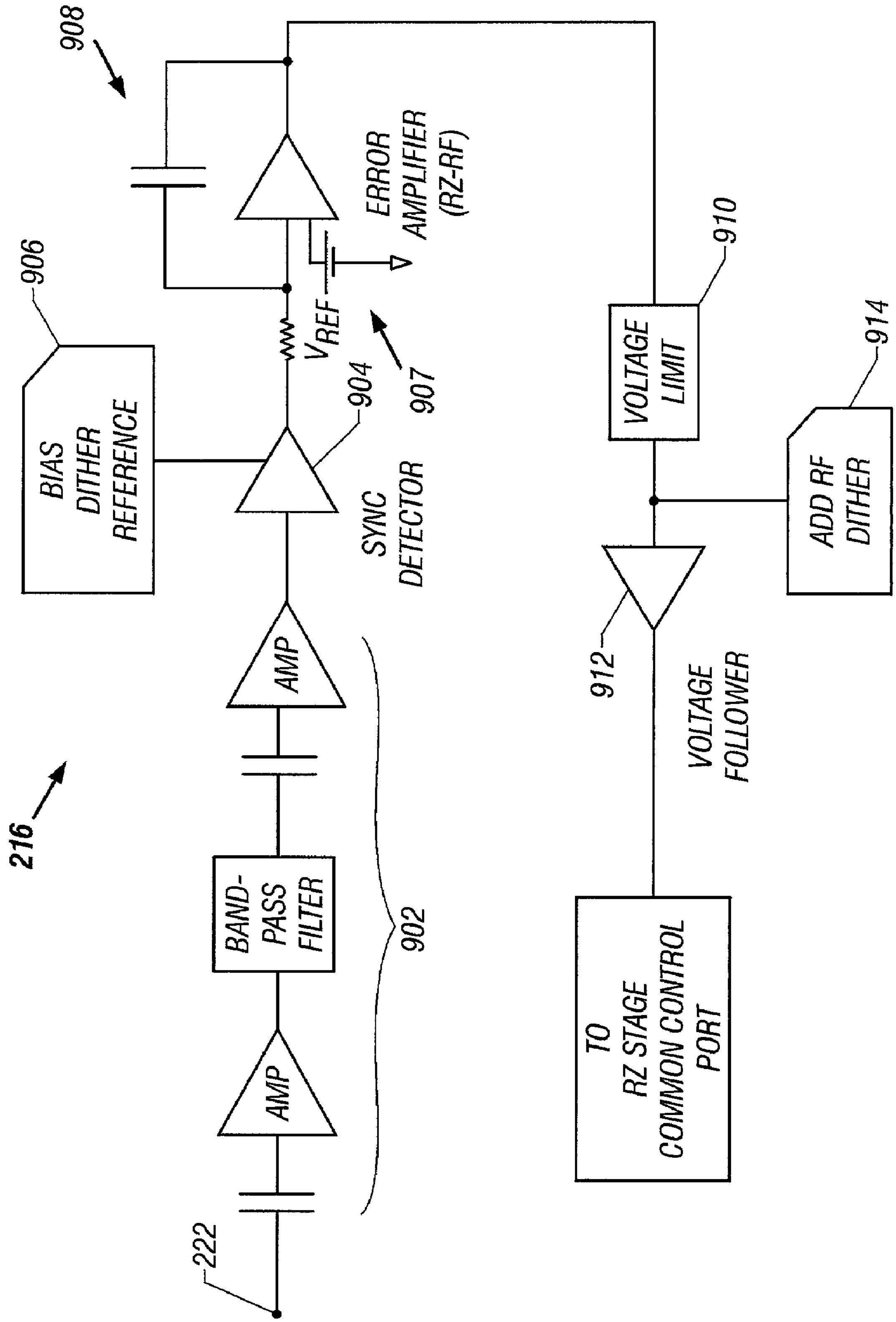
FIG. 9 depicts a circuit block diagram of an RF clock amplitude level feedback controller associated with the RZ stage of the two-stage modulator provided in accordance with the teachings of the present invention.

In essence, the circuits shown in FIGS. 8 and 9 are used to control the RZ stage. In other words, the feedback controllers of FIGS. 8 and 9 control the clock stage. The bias control voltage is used to control the RZ modulator section bias and the RF control voltage is used to control the amplitude of the clock signal that is applied to that stage. The clock signal is preferably provided as a sine wave, which means that it does not have instantaneous transitions and, therefore, an offset (a pedestal voltage) will be used as an input to an RF error amplifier therein.

Figure 10:
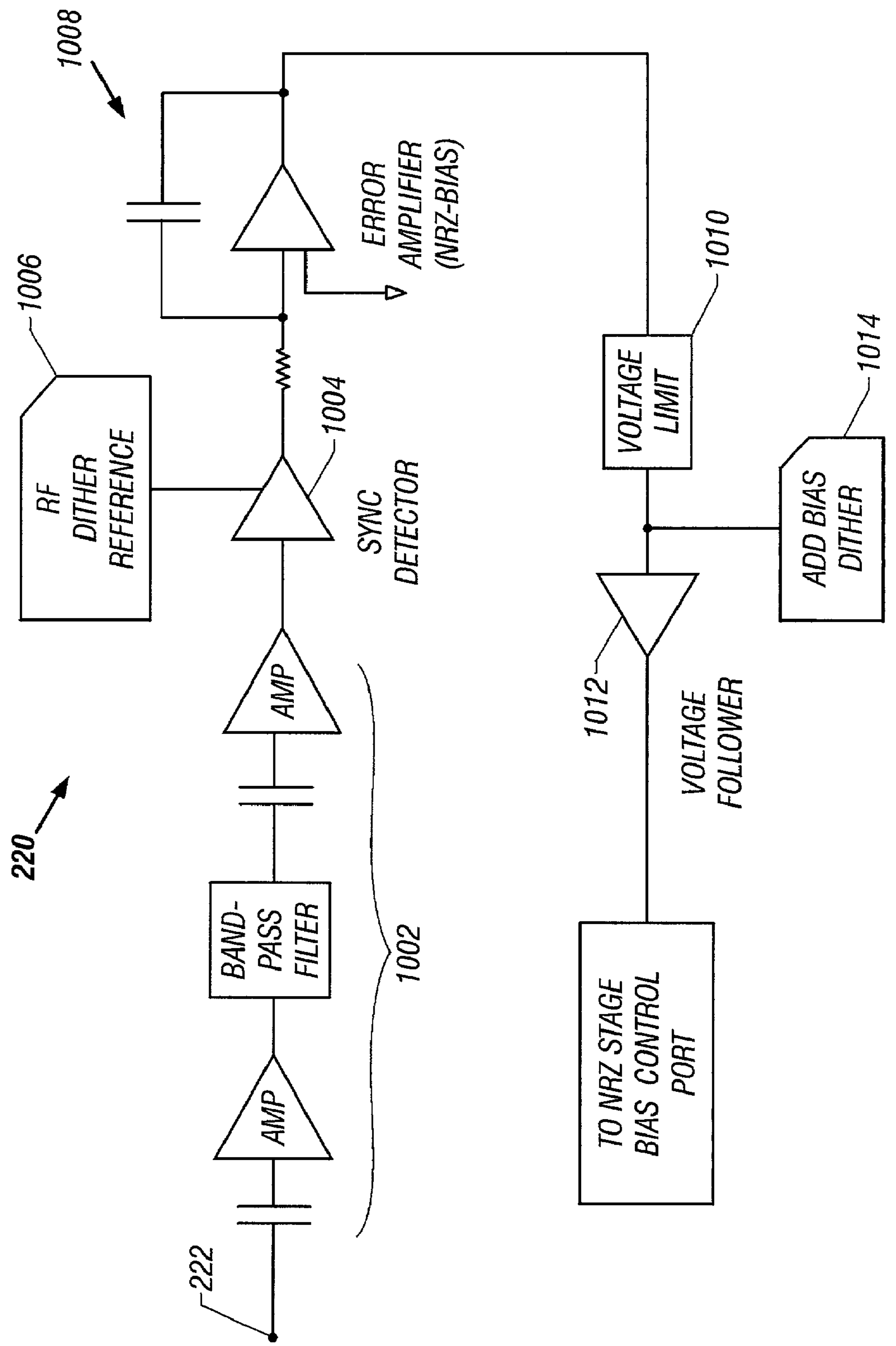
FIG. 10 depicts a circuit block diagram of a bias point feedback controller associated with the NRZ stage of the two-stage modulator provided in accordance with the teachings of the present invention.
Figure 11:
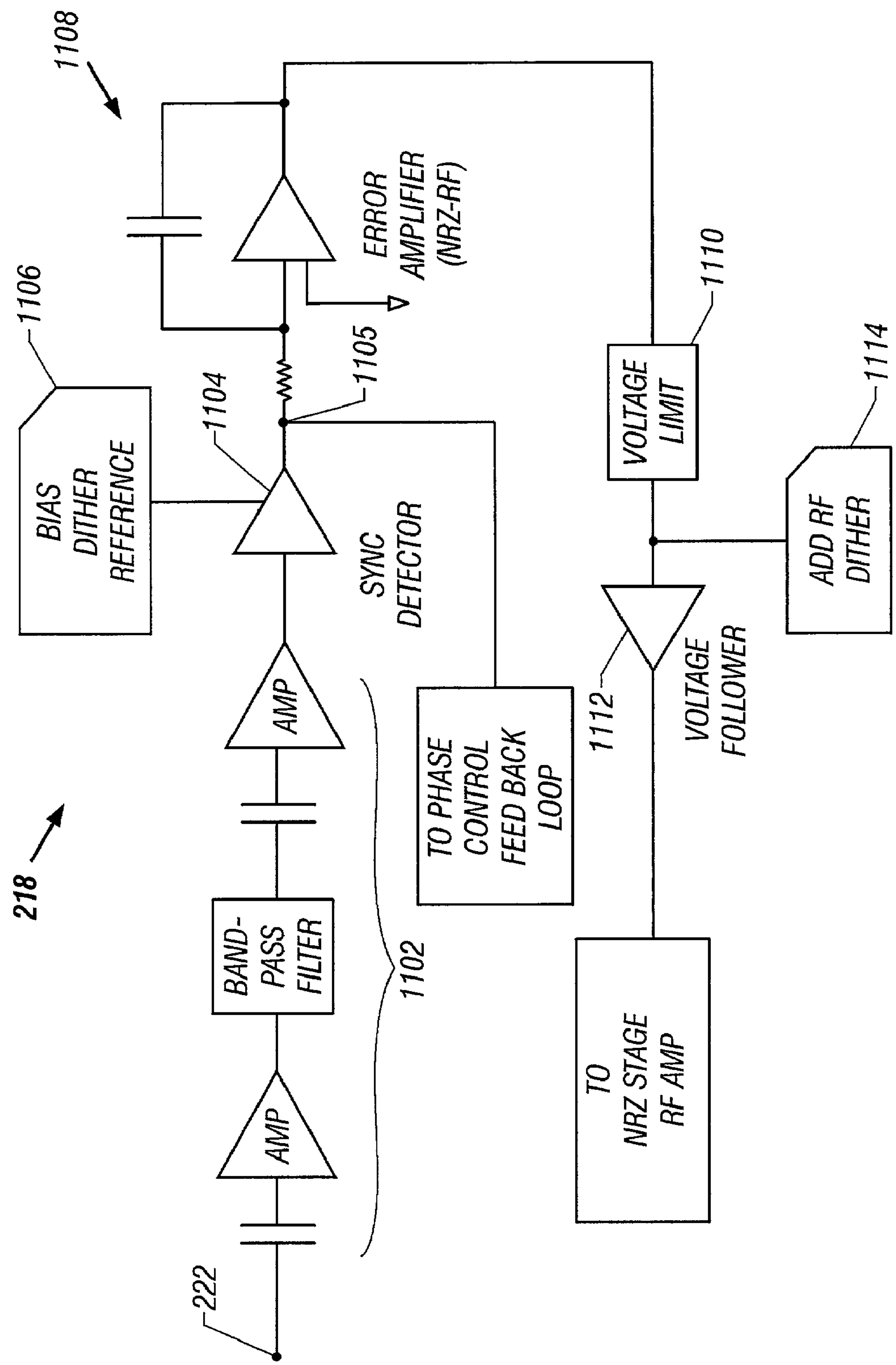
FIG. 11 depicts a circuit block diagram of an RF data amplitude level feedback controller associated with the NRZ stage of the two-stage modulator provided in accordance with the teachings of the present invention.

Taken together, the RZ stage control shown in FIGS. 8–9 and the NRZ stage control shown in FIGS. 10–11 are used to synchronize the data to the clock. The data transitions and the NRZ stage control occur at the same instance of clock transitions every data cycle. The data and clock are thus not only synchronous, but the clock is used to define the bit interval. Because the clock defines the bit interval, the present invention can use the clock to blank out half the bit interval and provide the RZ output coding.

Referring now to FIG. 8, depicted therein is a circuit diagram of the exemplary bias point feedback controller 214 associated with the RZ stage of the two-stage modulator provided in accordance with the teachings of the present invention. As alluded to hereinabove, a $1^{st}$ order negative feedback loop implementation as described in the incorporated NRZ Application is preferably used herein for realizing the exemplary RZ stage bias point feedback controller 214. Voltage output provided by the transconductance amplifier 212 (shown in FIG. 2) is available at common node 222, which is provided as an input to the various feedback controllers associated with the two-stage modulator arrangement 102 (shown in FIG. 2).

Continuing to refer to FIG. 8, the voltage signal available at node 222 is conditioned through a suitable filter-amplifier arrangement 802 including, among others, capacitive elements, bandpass filters and voltage-gain amplifiers. Conditioned output from the filter-amplifier arrangement 802 is then provided to a SYNC detector 804 operable in response to an RF dither reference signal (e.g., operating at 500 Hz) provided by suitable RF dither circuitry 806. The filter-amplifier arrangement 802 not only provides the appropriate level of the signal input to the SYNC detector 804, the loop gain for the RZ bias point feedback loop is also set thereby. As one skilled in the art should readily recognize, the level of gain for the loop can determine the operating speed of the loop. In one exemplary embodiment, the filters of filter-amplifier arrangement 802 can be off-the-shelf switched capacitor filters. Also, the SYNC detector 804 may preferably be comprised of an operational amplifier coupled to an analog switch.

The operational amplifier that is part of SYNC detector 804 has a gain that flips between +1 and −1. In other words, the operational amplifier flips between being a non-inverting amplifier and an inverting amplifier in synchronization with the RF dither signal. Thus, when the dither signal is low, the gain of SYNC detector 804 is −1. When the dither signal is high, SYNC detector 804 has a gain of +1.

As set forth in the incorporated NRZ Application, which provides additional details regarding the gain characteristics of a synchronous detector, SYNC detector 804 thus acts as a rectifier and changes the AC photodiode output signal into an appropriate DC output. Essentially, the positive and negative portions of the photodiode output are converted by the SYNC detector 804 to outputs of the same magnitude because the photodiode output signal is an AC signal that is symmetric around zero. SYNC detector 804 will continually adjust its gain to match the dither signal into the RZ stage modulator, providing either a slightly positive or a slightly negative DC voltage output to an RZ bias error amplifier 808 having a grounded reference input and a capacitive feedback (i.e., integrative feedback).

Error amplifier output is appropriately groomed by means of a voltage limiter 810 for limiting the voltage swings to a suitable range. Further, an RZ bias dither signal provided by an RZ bias dither circuit 814 may be added to the voltage output. A voltage follower stage 812 is then applied before the control signal is provided to the common control port of the RZ stage modulator.

FIG. 9 depicts a circuit diagram of the RF clock amplitude level feedback controller 216 associated with the RZ stage of the two-stage modulator provided in accordance with the teachings of the present invention. Those skilled in the art should be appreciate upon reference hereto that the $1^{st}$ order feedback loop implemented for the RF clock level is essentially similar to the RZ bias point feedback loop described in detail hereinabove. Accordingly, only the salient features are immediately set forth below.

The voltage output at the common node 222 is again conditioned by means of a suitable filter-amplifier arrangement 902 to remove unwanted frequencies and amplify the signal level appropriately. The conditioned voltage signal is then provided to a SYNC detector 904 operable responsive to a bias dither reference signal (e.g., operating at 250 Hz) provided by a bias dither circuit 906. The SYNC detector's output is provided to an RZ clock error amplifier 908 having a pedestal voltage ($V_{REF}$) 907 as its reference input. The output signal from the error amplifier 908 is then groomed by means of a voltage limiter 910, the output of which can be dithered via an RF dither signal provided by RF dither circuitry 914. A subsequent voltage follower stage 912 provides the dithered RF clock control signal to the common control port of the RZ stage modulator.

FIGS. 10 and 11 depict two circuit diagrams, respectively, of the exemplary NRZ stage bias point feedback controller and RF data amplitude level feedback controller associated with the NRZ stage of the two-stage modulator provided in accordance with the teachings of the present invention. With particular reference to FIG. 10, a conditioning filter-amplifier arrangement 1002 is provided for appropriately conditioning the voltage output at the common node 222 before it is provided to a SYNC detector 1004. An RF dither reference signal (e.g., operating at 500 Hz) generated by RF dither circuitry 1006 is supplied to the SYNC detector 1004, the output of which is provided to the NRZ bias error amplifier 1008.

The amplified bias error signal from the bias error amplifier 1008 is appropriately groomed by means of a voltage limit stage 1010 and bias dithering (e.g., at 250 Hz) provided by a bias dither circuit 1014. A subsequent voltage follower stage 1012 provides the dithered bias control signal to the bias control port of the NRZ stage modulator of the present invention.

Referring now in particular to FIG. 11, the NRZ RF level feedback controller 218 is also provided with the voltage output at the common node 222, which is conditioned by means of a suitable filter-amplifier arrangement 1102. The conditioned voltage signal is then provided to a SYNC detector 1104 that is operable responsive to a bias dither reference signal (e.g., operating at 250 Hz) provided by a bias dither circuit 1106.

As discussed in the NRZ Application, the output generated by the SYNC detector 1104, which output is available at node 1105, is forwarded to an NRZ RF error amplifier 1108 for generating a data amplitude error signal. A voltage limit stage 1110 and addition of appropriate RF dithering from RF dither circuitry 1114 that is followed by a voltage follower 1112, grooms the RF data level control signal before it is forwarded to the NRZ stage RF amplifier 226 (shown in FIG. 2), which controls the data amplitude level input to the NRZ stage modulator.

It should be appreciated by those skilled in the art that the various dither signal references used in the RZ stage and NRZ stage feedback controllers described above may be associated with, and related to, one another in a predetermined manner. First, a single RF dither source can supply the RZ stage RF dither reference in the RZ bias feedback control loop as well as the dither addition in the RZ RF level feedback control loop. Similarly, a single bias dither source can operate as the RZ stage bias reference in the RF clock level control loop, in addition to operating as a dither addition in the RZ bias feedback control loop. As explained in the incorporated NRZ Application, similar relationships exist for the NRZ bias and RF dither sources as well.

Figure 12:
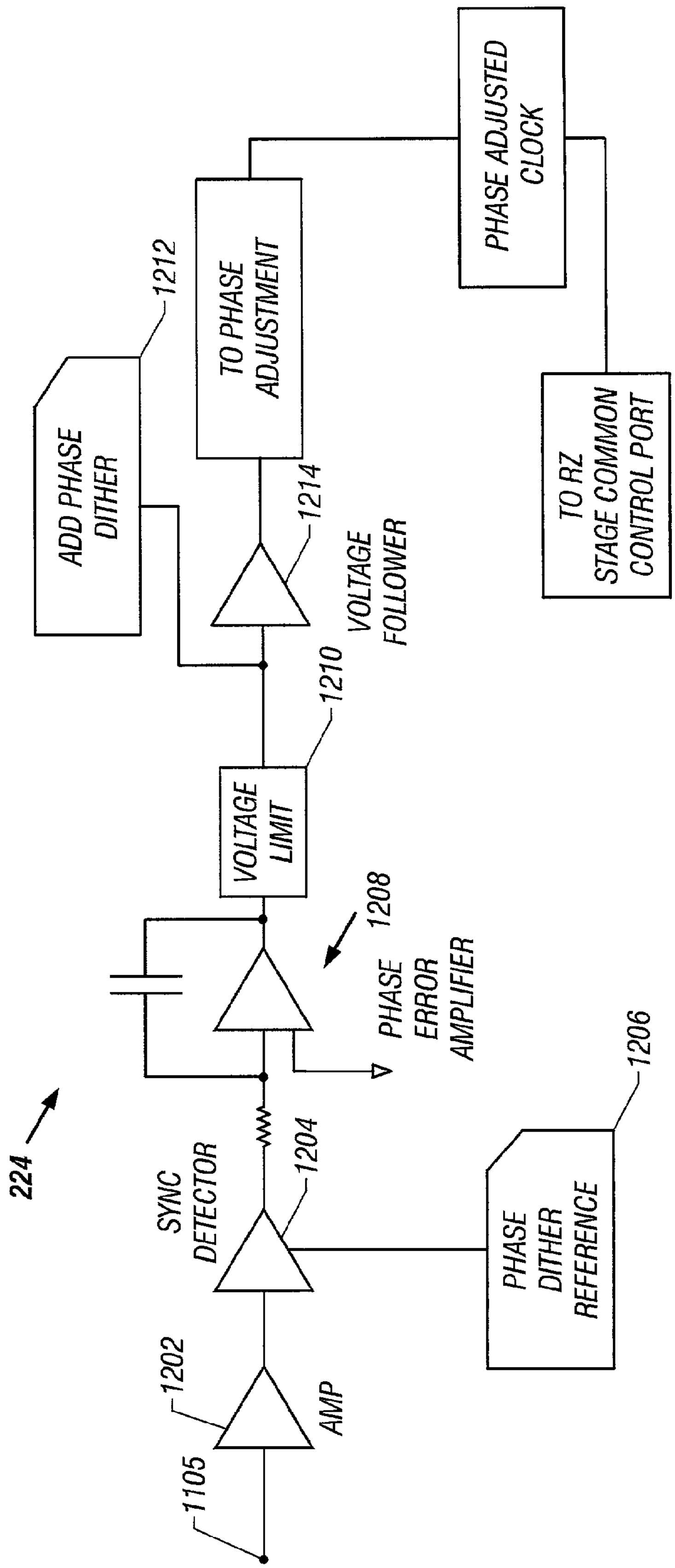
FIG. 12 depicts a circuit block diagram of a phase feedback controller provided in accordance with the teachings of the present invention for generating a phase control signal.

In accordance with the teachings of the present invention, the NRZ RF SYNC detector output available at node 1105 (shown in FIG. 11) is also provided as an input to the phase control feedback loop. FIG. 12 depicts a circuit diagram of the exemplary phase feedback controller 224 for generating a phase control signal. In essence, the feedback control method used in the phase control loop of FIG. 12 involves dithering the clock/data phase a small amount and detecting changes that the dither creates in the NRZ RF SYNC detector output. In the presently preferred exemplary embodiment, these changes are always in the positive direction and, therefore, a phase SYNC detector 1204 is typically employed. The phase SYNC detector 1204 decodes the changes and a phase error amplifier 1208 amplifies the detector output to control the phase. As set forth below, it will be seen that the basic circuitry is similar to the circuitry of the other control loops of FIGS. 8–11.

The output available at node 1105 in the NRZ RF control loop (FIG. 11) is provided to an amplifier 1202 in the phase control loop. Accordingly, the NRZ stage SYNC detector output is amplified and forwarded to the phase control loop SYNC detector 1204, which is operable in response to a phase control loop SYNC detector reference that is provided by a phase dither block 1206. The phase control loop SYNC detector 1204 is operable to decode the difference between the amplifier output and the phase dither reference as discussed above. As pointed out earlier, the SYNC detector 1204 in fact determines the difference in transitions and decodes the difference to determine whether the difference occurs on the falling slope or the rising slope of the signal so that the direction of any corrections can be determined. The output from the phase control loop SYNC detector 1204 is an AC waveform representative of the difference in phase, and is forwarded to the phase error amplifier 1208 where it is averaged over time. Because the output of the phase control SYNC detector 1204 is zero when the phase is at optimum, the phase error amplifier reference is grounded. This is so that the phase error amplifier can provide the negative feedback in the control loop to force the clock/data phase to an optimum value. Accordingly, the phase error amplifier 1208 in the phase control loop comprises the basis for implementing the negative feedback loop for phase control.

In general operation, the phase error amplifier 1208 attempts to make both its inputs equal to each other. Because the output of the phase control loop SYNC detector 1204 is zero at optimum, the present invention, through the feedback loop, seeks to force both inputs to the phase error amplifier to be equal (i.e., to be zero). Since the reference is zero volts, the feedback loop will force the phase SYNC detector output to zero volts, which corresponds to an optimum clock/data phase. The output of the phase control loop's phase error amplifier 1208 will thus be the voltage necessary for the phase adjuster of FIG. 1 to adjust the phase of the clock signal to create a phase-adjusted clock wherein the clock/data phase is at optimum.

The optimum data phase value can vary from modulator to modulator and can vary over temperature. The optimum value corresponds to the point where minimum transitions occur. This is not a set value, but does remain the same value for a given modulator. In the embodiment of present invention, the voltage signal indicative of the optimum clock/data phase can vary from about 2 V to 12 V. However, this value could be arbitrarily set to meet the requirements of a given implementation. For example, the nominal value of the voltage could be 7 V and could vary to take into account component changes over temperature and time.

The output of the phase error amplifier 1208 in the phase control loop is provided to a voltage limiter 1210, which is used to ensure that the voltage does not hit a rail (i.e., the voltage is ensured to remain within a suitable operating range). As can be seen at the output of the voltage limiter 1210, a phase dither signal provided by phase dither circuitry 1212 is added to the signal before it enters another operational amplifier, preferably a voltage follower stage 1214. The output of the operational amplifier at the end of the phase control loop is the phase control voltage. Preferably, the phase control voltage is limited, in this implementation, to a range of about 2–12 V to prevent damage to the electronics. This is so because the exemplary phase shifter/adjuster of FIG. 1 comprises a configuration of diodes that cannot drop below 0 V. To provide a margin of safety, the voltage provided to these diodes is accordingly limited to an appropriate range.

The voltage limiter 1210 of the phase control loop keeps the voltage at the last operational amplifier 1214 from exceeding the 2–12 V range, because the operational amplifier at the output of the voltage limiter 1210 is simply a voltage follower. That is, what it receives as an input, it provides as an output without a gain. Thus, if the voltage is limited at the input to the operational amplifier, the voltage is limited on the output. Also, because the phase dither is added prior to the last operational amplifier, the voltage is limited to provide space for the added phase dither voltage without causing the operational amplifier to go into saturation (i.e., hitting a positive or a negative rail). Otherwise, the added dither signal may not be able to get through the output operational amplifier 1214.

The phase dither added to the signal at the output of the voltage limiter 1210 is used to shift the phase back and forth by a small amount so as to cause a change in the transitions that occur. The change in transitions is then determined as discussed above, and the negative feedback loop is used to correct the circuit back to optimum parameter values. This occurs by adding phase dither with the phase dither reference input to the phase control loop SYNC detector 1204. At the output of the phase control loop, as set forth above, the phase control voltage is provided to the phase adjuster of FIG. 2, which can be an off-the-shelf or proprietary component.

Responsive to the phase control voltage, the phase adjuster is operable to shift the phase as necessary to align the clock and data signals. Typically, only a slight amount of loss occurs within the phase adjuster. The phase adjuster also takes as an input the clock signal with gain control and realigns it using the phase control signal (i.e., phase-shifted clock signal). In the presently preferred exemplary embodiment, the phase-shifted clock signal is provided as an output from the phase adjuster and is tied to the bias control input.

It should be appreciated by one skilled in the art that the various dither reference signals, e.g., for the phase control and RZ/NRZ stage RF level and bias control, may be multiplexed from a common dither source operable at 500 Hz. Or, as has been exemplified hereinabove, they may be provided as separate sources. Regardless of the specific dither reference circuitry implementation, however, the design considerations of the feedback controller arrangement of the present invention require that the various dither frequencies and their harmonics do not overlap.

Figure 13:
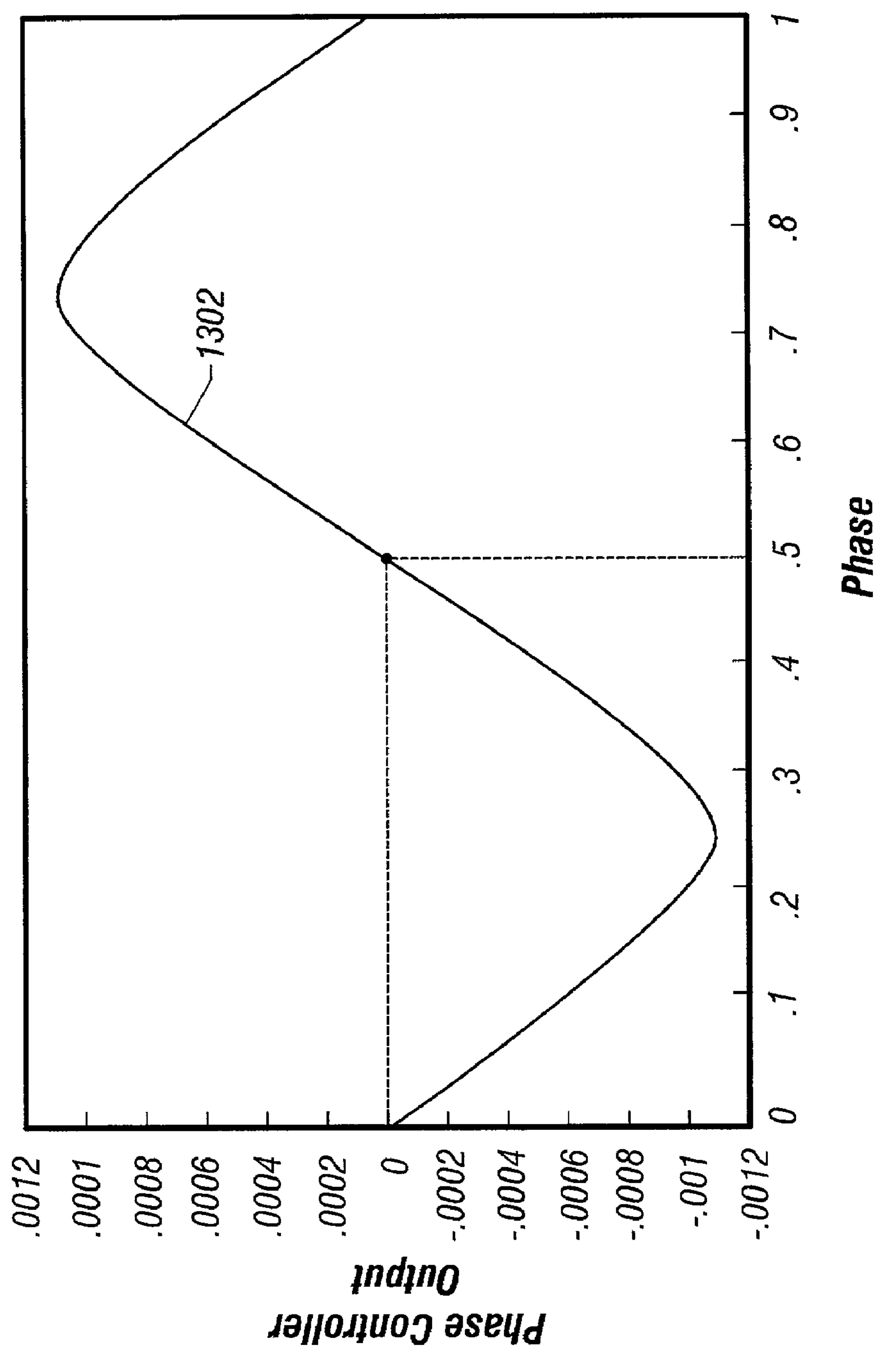
FIG. 13 is a graphical representation of the relationship between normalized phase control voltage and the clock/data phase difference.

Referring now to FIG. 13, depicted therein is a graphical representation of the relationship between normalized phase control voltage and the clock/data phase difference. Essentially, curve 1302 represents a transfer function of the phase control feedback loop circuitry of the present invention, wherein it can be seen that at a nominal clock/data phase value of 0.5, the phase controller output voltage is 0 V.

Figure 14:
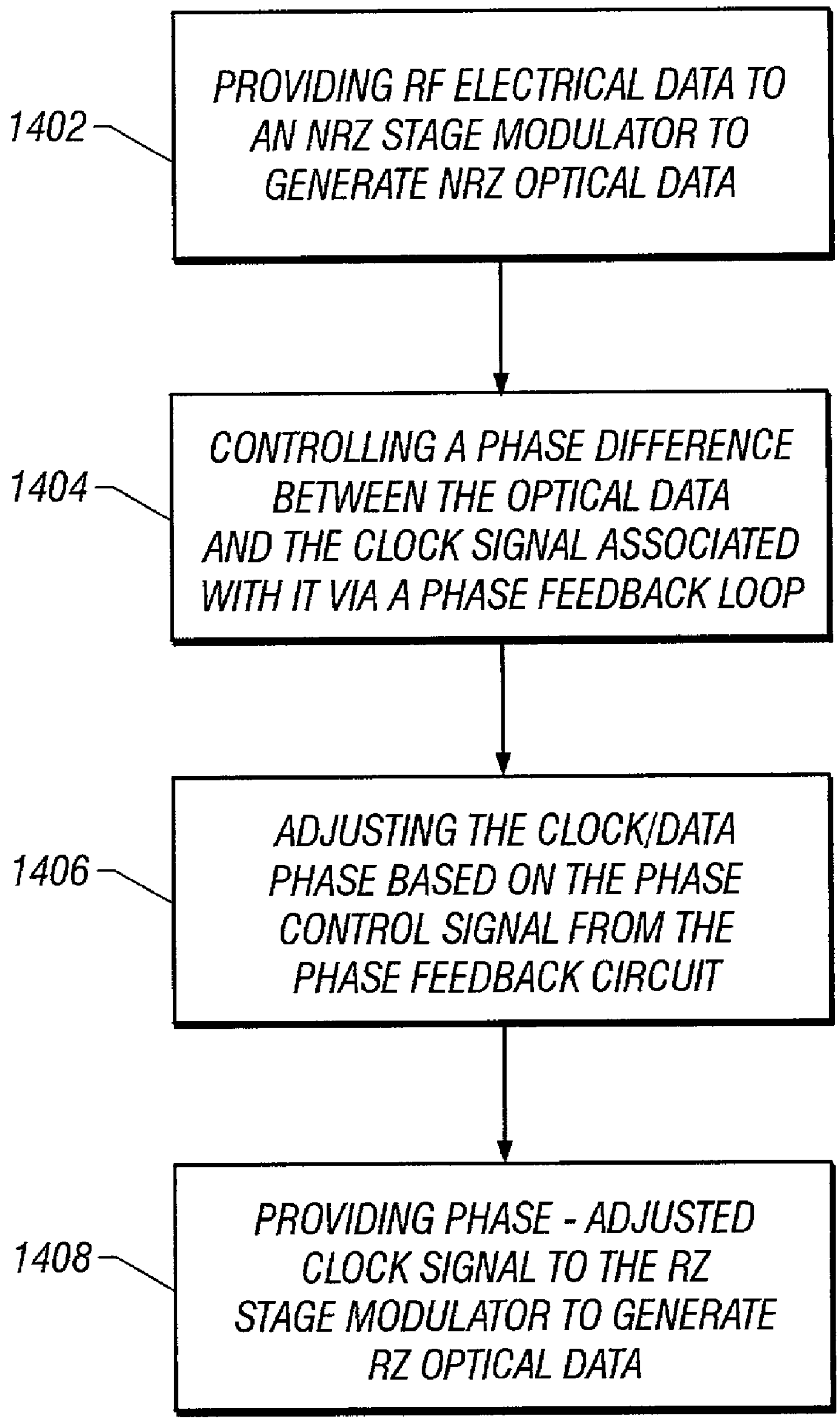
FIG. 14 is a flow chart of the various steps involved in an exemplary method of generating RZ optical data in accordance with the teachings of the present invention.

FIG. 14 is a flow chart of the various steps involved in an exemplary method of generating RZ optical data in accordance with the teachings of the present invention. Upon providing the RF electrical data to a first stage (i.e., the NRZ stage) modulator, which is controlled using the bias and amplitude level feedback control mechanisms as set forth above in detail, intermediary NRZ optical data output is generated thereby based on modulation (step 1402). The clock/data phase difference is controlled by determining the occurrence of transitions and using that information in the phase control feedback loop detailed above (step 1404). Based on the phase control signal provided by the phase feedback control circuit, the clock input is adjusted accordingly to generate a phase-adjusted clock signal (step 1406). Thereafter, the phase-adjusted clock signal is provided to a second stage (i.e., the RZ stage) modulator to blank out a select portion of data bit intervals of the NRZ optical data for creating RZ data output (step 1408).

Based upon the foregoing Detailed Description, it should be readily apparent that the present invention advantageously provides a robust control mechanism for controlling the clock/data phase differences in order that reliable RZ optical data suitable for long-haul transmission can be generated. It is believed that the operation and construction of the present invention will be apparent from the foregoing Detailed Description. Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and scope of this invention as defined in the following claims.

What is claimed is:

1. A method of generating return-to-zero (RZ) optical data in a digital lightwave communications system, comprising the steps:

providing radio frequency (RF) electrical data to a first stage modulator for modulating a light input so as to generate an intermediary optical data output having a non-return-to-zero (NRZ) format;

controlling a phase difference between said intermediary optical data output and a clock signal associated therewith using a feedback control loop operable responsive at least in part to a phase dither reference signal, wherein the step of controlling the phase difference comprises:

providing an output generated by a synchronous (SYNC) detector operable to detect signal transitions in said optical data due to a phase difference between said intermediary optical data output and said clock signal to an amplifier stage, said SYNC detector operating responsive at least in part to an RF amplitude dither reference signal in an RF data amplitude feedback control loop associated with said first stage modulator;

providing an output generated by said amplifier stage to a phase SYNC detector operating in response to said phase dither reference signal to generate a phase error signal; and providing said phase error signal to a phase error amplifier having its reference input grounded, said phase error amplifier operating to generate an output signal that is groomed into said phase control signal;

adjusting said clock signal based on a phase control signal provided by said feedback control loop to generate a phase-adjusted clock signal; and providing said phase-adjusted clock signal to a second stage modulator operable to blank out a select portion of data intervals of said intermediary optical data output for creating optical data having an RZ format.

2. The method of generating RZ optical data as set forth in claim 1, wherein said RF electrical data is operable in a Gigabits per second (Gbps) range.

3. The method of generating RZ optical data as set forth in claim 1, wherein said output signal is groomed in a voltage limitation step.

4. The method of generating RZ optical data as set forth in claim 3, wherein said voltage limitation step is followed by adding a phase dither signal.

5. The method of generating RZ optical data as set forth in claim 1, wherein said first stage modulator comprises a Mach-Zehnder modulator.

6. The method of generating RZ optical data as set forth in claim 1, wherein said second stage modulator comprises a Mach-Zehnder modulator.

7. The method of generating RZ optical data as set forth in claim 1, wherein said select portion of said data intervals comprises approximately a half data interval.

8. The method of generating RZ optical data as set forth in claim 1, wherein said first and second stage modulators are associated with an optical transmitter disposed in a long-haul digital lightwave communications system.

9. The method of generating RZ optical data as set forth in claim 1, further comprising the steps:

effectuating a bias point feedback control loop associated with said first stage modulator;

effectuating an RF clock amplitude feedback control loop associated with said second stage modulator; and effectuating a bias point feedback control loop associated with said second stage modulator.

10. The method of generating RZ optical data as set forth in claim 9, wherein said RF data amplitude feedback control loop associated with said first stage modulator is a it order negative feedback control loop.

11. The method of generating RZ optical data as set forth in claim 9, wherein said RF clock amplitude feedback control loop associated with said second stage modulator is a $1^{st}$ order negative feedback control loop.

12. The method of generating RZ optical data as set forth in claim 9, wherein said bias point feedback control loop associated with said first stage modulator is a $1^{st}$ order negative feedback control loop.

13. The method of generating RZ optical data as set forth in claim 9, wherein said bias point feedback control loop associated with said second stage modulator is a $1^{st}$ order negative feedback control loop.

14. The method of generating RZ optical data as set forth in claim 1, wherein said light input is provided by a continuous wave (CW) laser source.

15. A system for generating return-to-zero (RZ) optical data in a digital lightwave communications system, comprising:

- a first stage modulator operable to modulate a light input into an intermediary optical data output having a non-return-to-zero (NRZ) format based on a radio frequency (RF) electrical data provided thereto;
- a feedback controller operable to control a phase difference between said intermediary optical data output and a clock signal associated therewith, said feedback controller for generating a phase control signal, wherein said feedback controller includes:
  - an amplifier stage operable to receive an output generated by a synchronous (SYNC) detector operating to detect signal transitions in said optical data due to a phase difference between said intermediary optical data output and said clock signal, said SYNC detector operating responsive at least in part to an RF amplitude dither reference signal in an RF data amplitude feedback controller associated with said first stage modulator;
  - a phase SYNC detector coupled to said amplifier stage for receiving an output therefrom, phase SYNC detector operating in response to a phase dither reference signal to generate a phase error signal; and
  - a phase error amplifier operable responsive to said phase error signal, said phase error amplifier for generating an output signal that is groomed into said phase control signal;
- a phase adjuster operable to adjust said clock signal into a phase-adjusted clock signal based on said phase control signal; and
- a second stage modulator operable to blank out a select portion of data intervals of said intermediary optical data output for creating optical data having an RZ format, said second stage modulator operating responsive at least in part to said phase-adjusted clock signal.

16. The system for generating RZ optical data as set forth in claim 15, wherein said RF electrical data is operable in a Gigabits per second (Gbps) range.

17. The system for generating RZ optical data as set forth in claim 15, wherein said feedback controller further includes a voltage limiter for limiting said output signal to a predetermined range.

18. The system for generating RZ optical data as set forth in claim 17, wherein said feedback controller further includes means for adding a phase dither signal to said voltage limiter's output.

19. The system for generating RZ optical data as set forth in claim 15, wherein said first stage modulator comprises a Mach-Zehnder modulator.

20. The system for generating RZ optical data as set forth in claim 15, wherein said second stage modulator comprises a Mach-Zehnder modulator.

21. The system for generating RZ optical data as set forth in claim 15, wherein said select portion of said data intervals comprises approximately a half data interval.

22. The system for generating RZ optical data as set forth in claim 15, wherein said first and second stage modulators are associated with an optical transmitter disposed in a long-haul digital lightwave communications system.

23. The system for generating RZ optical data as set forth in claim 15, further comprising:

- a bias point feedback controller associated with said first stage modulator for providing a bias control signal thereto;
- an RF clock amplitude feedback controller associated with said second stage modulator for providing an RF clock amplitude control signal thereto; and
- a bias point feedback controller associated with said second stage modulator for providing a bias point control signal thereto to optimally bias said optical data.

24. The system for generating RZ optical data as set forth in claim 23, wherein said RF data amplitude feedback controller associated with said first stage modulator is a $1^{st}$ order negative feedback control circuit.

25. The system for generating RZ optical data as set forth in claim 23, wherein said RF clock amplitude feedback controller associated with said second stage modulator is a $1^{st}$ order negative feedback control circuit.

26. The system for generating RZ optical data as set forth in claim 23, wherein said bias point feedback controller associated with said first stage modulator is a $1^{st}$ order negative feedback control circuit.

27. The system for generating RZ optical data as set forth in claim 23, wherein said bias point feedback controller associated with said second stage modulator is a $1^{st}$ order negative feedback control circuit.

28. The system for generating RZ optical data as set forth in claim 15, wherein said light input is provided by a continuous wave (CW) laser source.

* * * * *